A. H. PAGE.
Clothes-Wringers.

No. 5,225. Reissued Jan. 7, 1873.

WITNESSES.

INVENTOR.

Alby H. Page,
by his attorney F. L. Stetson.

AM PHOTO-LITHOGRAPHIC CO. N.Y. (OSBORNE'S PROCESS.)

UNITED STATES PATENT OFFICE.

ALBY H. PAGE, OF MANCHESTER, NEW HAMPSHIRE, ASSIGNOR, BY MESNE ASSIGNMENTS, TO THE METROPOLITAN WASHING-MACHINE COMPANY.

IMPROVEMENT IN CLOTHES-WRINGERS.

Specification forming part of Letters Patent No. 61,680, dated January 29, 1867; reissue No. 5,225, dated January 7, 1873.

DIVISION C.

*To all whom it may concern:*

Be it known that I, ALBY H. PAGE, of Manchester, Hillsborough county, New Hampshire, formerly of South Boston, in the county of Suffolk and State of Massachusetts, have invented a new and useful Improvement in Clothes-Wringers; and I do hereby declare that the following is a full, clear, and exact description thereof, reference being had the accompanying drawing and to the letters of reference thereon, in which—

Figure 2:
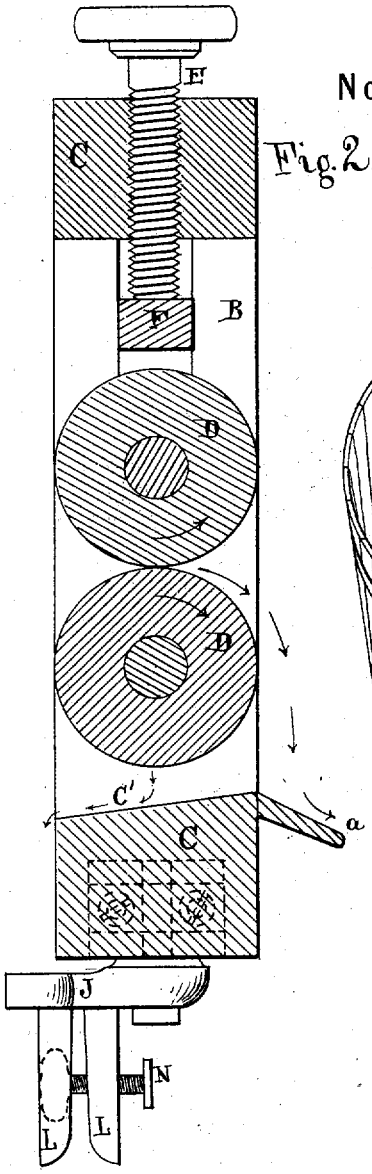
Figure 1:
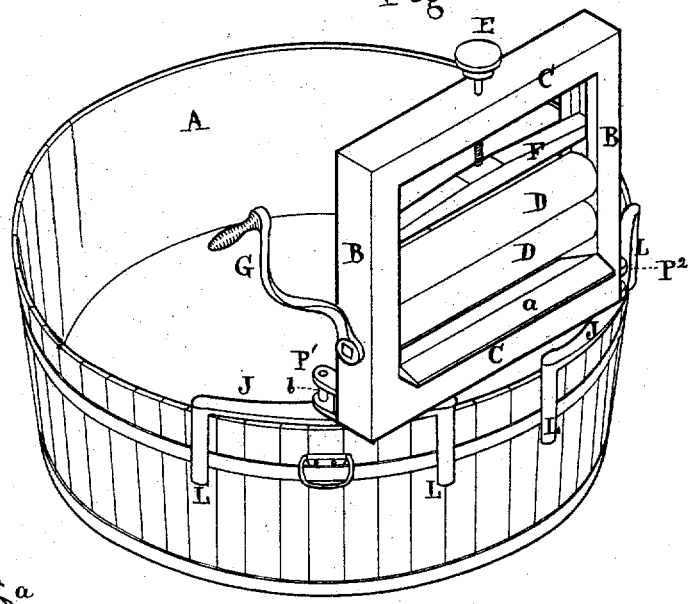
Figure 3:
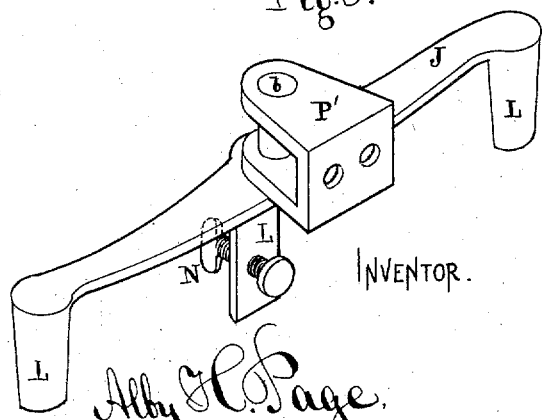

Figure 1 represents a perspective view of a wash-tub with my improved wringer clamped thereto. Fig. 2 is a vertical transverse section taken through the wringer, and showing the operation of the same. Fig. 3 is a perspective view of the clamp removed from the wringing-frame.

Similar letters of reference indicate like parts in all the figures.

The invention applies to machines for the wringing, washing, and starching of clothes by passing them between parallel rollers covered with India rubber or other elastic material, and so arranged and adjusted that the clothes can be passed between them with a proper degree of pressure to expel the water or other liquid. It relates to provisions for disposing of the water and the clothes after they are separated in the machine. The portable frame presents a surface to receive the water, which is inclined so as to conduct the water toward the center of the tub, thus preventing its trickling down on both sides of the frame with a risk of dropping upon the floor or upon the wrung clothes. The clothes are guided in the opposite direction by a projecting guide. The machine overhangs in part on the inside of the tub.

A represents an ordinary wash-tub. B B and C C represent a frame, of wood or other suitable material, for holding the rolls, with the inclined surface C′ to carry the water into the tub. A projecting shelf, *a*, inclined in the opposite direction, serves as a clothes-guide to conduct the wrung clothes over the sides of the tub. D D are two rollers, which are parallel to each other, and have their bearings in the frame-pieces or standards B B. These rollers are covered with white or light-colored India rubber. The upper roller B is capable of adjustment by means of a thumb-screw, E, which presses upon a bridge or spring, F, which presses upon the bearing-blocks of the upper roller.

The advantages of this manner of adjusting the pressure by means of a single screw and bridge from one bearing to the other are obvious, as it allows the roll to balance on the point of pressure, and either end to rise or open most according to the thickness of clothes passing through, and only one screw has to be turned to adjust the roll.

The roller D is rotated by crank G on the outside of the frame.

J J represent two curved bars with fingers L L L, set-screw N, brackets $P^1$ $P^2$ with studs *b*, which constitute my devices for clamping the wringer to a tub.

This construction presents a swivel or joint which allows each clamping device to turn, and thus adapt itself perfectly to tubs and washing-machines of different sizes and forms.

The bracket $P^1$ is on the inner face of the framing, while the bracket $P^2$ is on the edge. This arrangement holds the operating-crank G outboard of the tub, so as to allow it more room to turn, while the main body of the wringer is held sufficiently within the tub to allow the water to be all led inward.

Both brackets $P^1$ and $P^2$ are so placed that the framing B B and the contained rolls overhang on the interior of the tub rather than overhang on the exterior, or even stand over the edge. It follows, from their position, that the water expressed from the clothes in passing between the rollers tends to fall within the tub independently of the incline C′.

Having thus fully described my invention, I will refer more particularly to what I claim as new and useful.

I do not claim the application of an elastic gum to the rolls of the wringing-machine; nor do I claim the application of screws for adjusting the pressure; but

What I claim in this patent, as an improvement in clothes-wringers, is—

1. In combination with elastic rolls mounted in a portable framing, with means for connecting and disconnecting the framing on the edge of a tub, an incline arranged beneath the rolls, adapted to conduct the water therefrom inward toward the center of the tub, as specified.

2. The arrangement of the clamping-fingers L L and tightening means N relatively to the framing B and rollers D D, so that when clamped upon a tub the water expressed by the rollers shall tend to fall within the interior of the tub independently of the incline C′, as herein specified.

In testimony whereof I have hereunto set my name in presence of two subscribing witnesses.

ALBY H. PAGE.

Witnesses:

THOMAS D. STETSON,

ALF. WESTBROOK.